(12) United States Patent
Lu et al.

(10) Patent No.: US 12,500,238 B2
(45) Date of Patent: Dec. 16, 2025

(54) ELECTRODE MATERIAL AND PRODUCTION METHOD AND APPLICATION THEREOF

(71) Applicants: NATIONAL TAIWAN UNIVERSITY OF SCIENCE AND TECHNOLOGY, Taipei (TW); Technische Universität Braunschweig, Braunschweig (DE); University of Münster, Münster (DE)

(72) Inventors: Cheng-Yen Lu, Taipei (TW); Chi-Yang Chao, Taipei (TW); Nae-Lih Wu, Taipei (TW); Bing-Joe Hwang, Taipei (TW); Arno Kwade, Braunschweig (DE); Tobias Placke, Münster (DE); Martin Winter, Münster (DE); Jannes Müller, Braunschweig (DE)

(73) Assignees: NATIONAL TAIWAN UNIVERSITY OF SCIENCE AND TECHNOLOGY, Taipei (TW); TECHNISCHE UNIVERSITÄT BRAUNSCHWEIG, Braunschweig (DE); UNIVERSITY OF MÜNSTER, Münster (DE)

( * ) Notice: Subject to any disclaimer, the term of this patent is extended or adjusted under 35 U.S.C. 154(b) by 978 days.

(21) Appl. No.: 17/554,468

(22) Filed: Dec. 17, 2021

(65) Prior Publication Data

US 2023/0197953 A1    Jun. 22, 2023

(51) Int. Cl.
*C08L 71/12* (2006.01)
*C08L 5/08* (2006.01)
(Continued)

(52) U.S. Cl.
CPC .............. *H01M 4/583* (2013.01); *C08L 5/08* (2013.01); *C08L 71/126* (2013.01); *H01M 4/366* (2013.01); *H01M 10/0525* (2013.01)

(58) Field of Classification Search
CPC .. H01M 4/583; H01M 4/366; H01M 10/0525; C08L 71/126; C08L 5/05
See application file for complete search history.

(56) References Cited

U.S. PATENT DOCUMENTS

2021/0391579 A1* 12/2021 Haldar .............. H01M 10/0525

FOREIGN PATENT DOCUMENTS

| CN | 113571690 A | 10/2021 |
|----|-------------|---------|
| TW | 1328565 B | 7/2010 |

(Continued)

OTHER PUBLICATIONS

Kalaiselvimary et Al., Preparation and characterization of chitosan-based nanocomposite hybrid polymer electrolyte membranes for fuel cell application, 2018, Ionics, vol. 24, pp. 3555-3571 (Year: 2018).*

(Continued)

*Primary Examiner* — Nicholas A Smith
*Assistant Examiner* — Benjamin Eli Kass-Mullet
(74) *Attorney, Agent, or Firm* — LANWAY IPR SERVICES; Chun-Ming Shih

(57) ABSTRACT

The present invention provides an electrode material and production method thereof. The electrode material comprises: an electrode active material; and an elastic layer coated on the electrode active material, wherein the elastic layer comprises the elements of C, H, O, N, S and the electrode material has the characteristic peaks at mass-to-charge ratio (m/z) 261±0.5, (m/z) 155±0.5, (m/z) 80±0.5, (m/z) 32±0.5, and (m/z) 14±0.5 using TOF-SIMS with the primary ion of $Bi^{1+}$.

14 Claims, 16 Drawing Sheets

(51) Int. Cl.
H01M 4/36 (2006.01)
H01M 4/583 (2010.01)
H01M 10/0525 (2010.01)

(56) References Cited

FOREIGN PATENT DOCUMENTS

WO 2014021689 A1 2/2014
WO 2015126227 A1 8/2015

OTHER PUBLICATIONS

Tsai et Al. "Preparation and properties of sulfopropyl chitosan derivatives with various sulfonation degree", 2010, Journal of Applied Polymer Science, vol. 116, issue 3, pp. 1686-1693 (Year: 2010).*
Liu et Al., "Radiation-initiated high strength chitosan/lithium sulfonate double network hydrogel/aerogel with porosity and stability for efficient CO2 capture", 2021, RSC Adv, Issue 33, pp. 20486-20497 (Year: 2021).*
Sixun et Al., "Epoxy resin/poly(ethylene oxide) blends cured with aromatic amine", 1995, Polymer, vol. 36, pp. 3609-3613 (Year: 1995).*

* cited by examiner

ELECTRODE MATERIAL AND PRODUCTION METHOD AND APPLICATION THEREOF

BACKGROUND OF THE INVENTION

1. Field of the Invention

The present invention relates to an electrode material and production method and application thereof, especially to an electrode material for Lithium-ion battery and production method and application thereof.

2. Description of Related Art

In order to solve the problem of energy shortage and environmental pollution, electric vehicles have become the next important industry trend. At present, the energy of electric vehicles mainly uses lithium-ion batteries (LIB). Although lithium-ion batteries have been widely used in portable consumer electronics, the requirements are more severe in electric vehicles in terms of high energy density and rapid charge and discharge capabilities. Therefore, the introduction of silicon in the electrode material is used to increase the battery capacity. In recent years, the most promising electrode material is silicon-carbon composite materials using graphite or various forms of carbon materials, thereby improving capacity and energy density of the battery without modifying the materials and assembly of the existing commercial batteries.

Although the silicon-carbon electrode materials can increase the battery capacity, the difference in volume expansion between silicon and carbon material causes increase of electrode thickness and further results in cracks and collapse of the electrode materials due to obvious volume expansion of silicon during the charge-discharge cycle, and finally leads to a poor cycle stability. To this end, Cao et al. prepared a silicon-carbon electrode using a polymer of modified chitosan and cross-linked glutaraldehyde as a binder to limit the volume expansion of the silicon-carbon electrode materials in order to improve cycle stability (Rational Design of a Multifunctional Binder for High-Capacity Silicon-Based Anodes. ACS Energy Letters 2019, 4 (5), 1171-1180).

However, using chitosan as a binder in a large proportion will sacrifice partial content of the anode active material in the electrode. At the same time, glutaraldehyde is a toxic reagent, which will cause restrictions on the mass production of electrode materials and environmental pollution. Therefore, looking for more suitable non-toxic formulas to develop electrode materials and improve the cycle stability and capacity of the lithium-ion batteries can lay a good foundation for the development of the next generation of lithium-ion batteries.

SUMMARY OF THE INVENTION

The present invention provides an electrode material comprising: an electrode active material; and an elastic layer coated on the surface of the electrode active material, wherein the elastic layer comprises elements of carbon (C), hydrogen (H), oxygen (O), Nitrogen (N), and Sulfur (S), and the electrode material has the characteristic peaks at mass-to-charge ratio (m/z) 261±0.5, (m/z) 155±0.5, (m/z) 80±0.5, (m/z) 32±0.5, and (m/z) 14±0.5 using Time-of-Flight Secondary Ion Mass Spectrometer (TOF-SIMS) with the primary ion of $Bi^{1+}$.

In another aspect, the present invention provides a production method of an electrode material comprising: sulfonating chitosan with sulfuric acid and chlorosulfonic acid; substituting monovalent cations on the sulfonic acid group of the chitosan by neutralization reaction to form a sulfonated chitosan; synthesizing epoxy polyethylene oxide by functionalizing two terminals of the polyethylene oxide using epichlorohydrin; and mixing an electrode active material with the sulfonated chitosan (or sulfonate-containing chitosan or chitosan having sulfonic acid group) and the epoxy polyethylene oxide in an alkaline solution to undergo crosslinking to form the electrode material.

In another aspect, the present invention also provides a lithium-ion battery structure comprising: a separator, an electrolyte, and at least one electrode made from the electrode material of any one of claims 1 to 14.

The electrode material provided by the present invention has many advantages. The electrode active material is coated by the elastic layer, and the elastic layer can limit the volume expansion of the electrode active material. In particular, the elastic layer is made by cross-linking sulfonated chitosan with polyethylene oxide. Compared to using glutaraldehyde as the cross-linker, polyethylene oxide is not only non-toxic, but also can provide the coating elastic layer flexibility and stretchability. The coating elastic layer formed on the electrode active material by crosslinking can deform to accommodate the volume expansion of the electrode material during battery cycling to relief the excess stress, and thus to assure the integrity of the coating layer.

In addition, when the electrode material of the present invention is prepared into an electrode, the active material content in the electrode can be maintained up to 90% due to the use of sulfonated chitosan, and the lithium sulfonate group therein can also improve lithium-ion conductivity. At the same time, the polyethylene oxide segment can also help the dissociation and conduction of the lithium sulfonates, further improving the ion conductivity of the elastic layer of the present invention. The elastic layer having cross-linked structure can protect the electrode active material by preventing direct contact between the electrolyte and the electrode active material, thereby slowing down thickening of the solid electrolyte interphase (SEI) and decelerating continuous consumption and decomposition of the electrolyte to allow good compactness and stability of the SEI. Meanwhile, it also provides good structural stability in an acid environment, so that the electrode active material will not be easily dissolved in the subsequent electrode manufacturing process.

DETAILED DESCRIPTION OF THE PREFERRED EMBODIMENTS

Figure 1A:
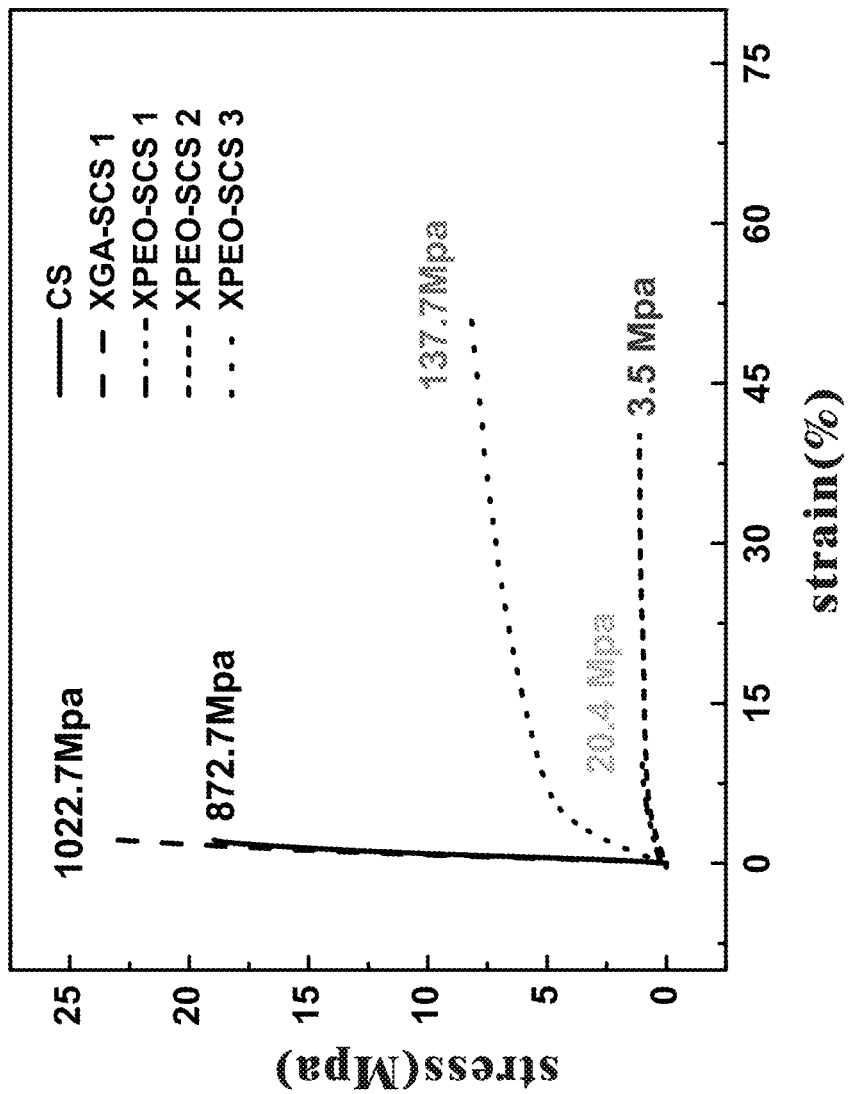
FIG. 1A shows the analysis results of the mechanical properties of each material in Table 1.

In the first aspect, the present invention provides an electrode material comprising: an electrode active material; and an elastic layer coated on the surface of the electrode active material, wherein the elastic layer comprises elements of carbon (C), hydrogen (H), Oxygen (O), Nitrogen (N), and Sulfur (S), and the electrode material has the characteristic peaks at mass-to-charge ratio (m/z) 261±0.5, (m/z) 155±0.5, (m/z) 80±0.5, (m/z) 32±0.5, and (m/z) 14±0.5 using Time-of-Flight Secondary Ion Mass Spectrometer (TOF-SIMS) with the primary ion of $Bi^{1+}$. The elastic layer may be used as a protective layer, and the electrode material may be a cathode electrode material or an anode electrode material.

In another aspect, the present invention provides a production method of an electrode material comprising: sulfonating chitosan with sulfuric acid and chlorosulfonic acid; substituting monovalent cations on the sulfonic acid group of the chitosan by neutralization reaction to form a sulfonated chitosan; synthesizing epoxy polyethylene oxide by functionalizing two terminals of polyethylene oxide using epichlorohydrin (i.e. grafting the epoxide terminal of the epichlorohydrin on polyethylene oxide); and mixing an electrode active material with the sulfonated chitosan and the epoxy polyethylene oxide in an alkaline solution to undergo crosslinking to form the electrode material.

In another aspect, the present invention also provides a lithium-ion battery structure comprising: a separator, an electrolyte, and at least one electrode made from the electrode material of any one of claims 1 to 14.

In some embodiments, the total intensity of the characteristic peaks at mass-to-charge ratio (m/z) 261±0.5 exceeds $3 \times 10^2$ in the analysis of the electrode material using TOF-SIMS with the primary ion of $Bi^{1+}$.

In some embodiments, the total intensity of the characteristic peaks at mass-to-charge ratio (m/z) 32±0.5 exceeds $4 \times 10^3$ in the analysis of the electrode material using TOF-SIMS with the primary ion of $Bi^{1+}$.

In some embodiments, the total intensity of the characteristic peaks at mass-to-charge ratio (m/z) 80±0.5 exceeds $6 \times 10^3$ in the analysis of the electrode material using TOF-SIMS with the primary ion of $Bi^{1+}$.

In some embodiments, the total intensity of the characteristic peaks at mass-to-charge ratio (m/z) 14±0.5 exceeds $2 \times 10^4$ in the analysis of the electrode material using TOF-SIMS with the primary ion of $Bi^{1+}$.

In some embodiments, the total intensity of the characteristic peaks at mass-to-charge ratio (m/z) 155±0.5 exceeds $2 \times 10^3$ in the analysis of the electrode material using TOF-SIMS with the primary ion of $Bi^{1+}$.

In some embodiments, in the analysis of the electrode material using TOF-SIMS with the primary ion of $Bi^{1+}$, the ratio of the total intensity of the characteristic peaks at mass-to-charge ratio (m/z) 261±0.5 to the total intensity of the characteristic peaks at mass-to-charge ratio (m/z) 80±0.5 is no less than 0.2%.

In some embodiments, in the analysis of the electrode material using TOF-SIMS with the primary ion of $Bi^{1+}$, the ratio of the total intensity of the characteristic peaks at mass-to-charge ratio (m/z) 261±0.5 to the total intensity of the characteristic peaks at mass-to-charge ratio (m/z) 32±0.5 is greater than 2%.

In some embodiments, in the analysis of the electrode material using TOF-SIMS with the primary ion of $Bi^{1+}$, the ratio of the total intensity of the characteristic peaks at mass-to-charge ratio (m/z) 261±0.5 to the total intensity of the characteristic peaks at mass-to-charge ratio (m/z) 14±0.5 is greater than 0.5%.

In some embodiments, the electrode active material may be a cathode active material or an anode active material, and the anode active material comprises but not limited to a carbon material, a silicon-carbon composite material, or a combination thereof. The carbon material comprises but not limited to natural graphite, artificial graphite, hard carbon, and soft carbon. The silicon-carbon composite material comprises but not limited to a composite material of silicon and graphite, a composite material of silicon and carbon, or a composite material of silicon and graphene. For example, the electrode active material may be a silicon-carbon nanoparticle.

In some embodiments, the structural formula of the sulfonated chitosan is formula 1,

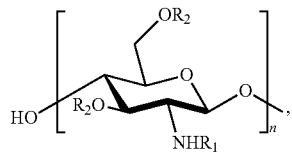

$R_1$ is —H, —COCH$_3$ or —C$_3$H$_6$SO$_3$H, $R_2$ is —SO$_3$H, —SO$_3$Na, —SO$_3$K, —SO$_3$Li or H. For example, the sulfonated chitosan may be a sulfonated chitosan which is grafted to the lithium sulfonate groups, and the exemplary structural formula is

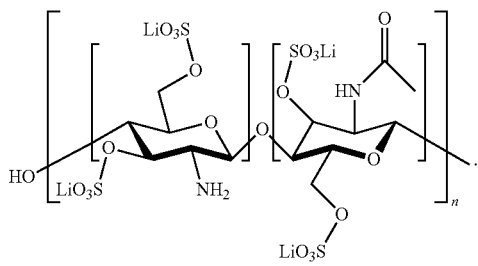

In some embodiments, the elastic layer is a polymer of sulfonated chitosan cross-linked with epoxy polyethylene oxide, and the weight ratio of sulfonated chitosan to epoxy polyethylene oxide is between 1:0.2 and 1:1.1, such as 1:0.2, 1:0.3, 1:0.4, 1:0.5, 1:0.6, 1:0.7, 1:0.8, 1:0.9, 1:1, 1:1.1.

In some embodiments, the volume ratio of sulfuric acid to chlorosulfonic acid is 3:1 or 2:1.

In some embodiments, the equivalent ratio of chlorosulfonic acid to the hydroxyl group of chitosan is between 5:1 and 1:1, such as 5:1, 4:1, 3:1, 2:1, 1:1, and most preferably 5:1.

Unless otherwise defined herein, all technical and scientific terms used have the same meaning as commonly understood by those skilled in the art to which the present invention belongs. In the case of conflict, the present document, including definitions will control.

As used herein, "the total intensity (I) of the charge-to-mass ratio X±0.5" or "the total intensity (I) of the characteristic peaks at charge-to-mass ratio X±0.5" represents the sum of all intensity values in the range between the charge-to-ratio X plus 0.5 and X minus 0.5, but does not count the noise value less than 10. For example, the total intensity of the charge-to-mass ratio (m/z) 261±0.5 would be calculated by adding the intensity values of all positions between (m/z) 260.5 to (m/z) 261.5 (such as 260.5, 260.6, 260.7, 260.8, etc.) together, except the positions where the intensity value are less than 10.

As used herein, the articles "a", "an" and "any" refer to one or more than one (i.e. at least one) grammatical items. For example, "a component" means a component or more than a component.

The term "about", "approximately" or "nearly" used herein substantially represents the stated value or range within 20%, preferably within 10%, and more preferably within 5%. The digitized quantities provided in the article are approximate value, meaning that if the terms "about", "approximately" or "nearly" are not used, they can be inferred.

As used herein, the term "chitosan" refers to a linear polysaccharide composed of randomly distributed β-(1->4)-linked D-glucosamine (deacetylated unit) and N-acetyl-D-glucosamine (acetylated unit). Its weight average molecular weight is between 100 thousand and 500 thousand, and it has the chemical structural formula 2,

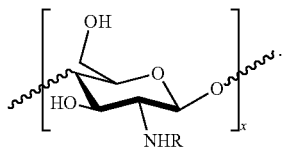

R= H or Ac

As used herein, the term "degree of deacetylation (DD)" or "sulfonation degree" refers to the molar ratio of D-glucosamine to monosaccharide units of chitosan. In some specific embodiments, the degree of deacetylation is 10% to 99%, more preferably 50% to 99%, and most preferably 60%, 62%, 64%, 66%, 68%, 70%, 72%, 74%, 76%, 78%, 80%, 82%, 84%, 86%, 88%, 90%, 92%, 94%, 96%, 98%, or 99%.

As used herein, the term "degree of sulfonation (DS)" refers to the relative atomic ratio of sulfur to nitrogen in the sulfonated chitosan. In some embodiments, the degree of sulfonation of the sulfonated chitosan may be 150~200%, such as 150%, 155%, 160%, 165%, 170%, 175%, 180%, 185%, 190%, 195%, 200%.

As used herein, the term "epoxy polyethylene oxide (ePEO)" refers to the polyethylene oxide with epoxide group in both terminals, the molecular weight is between 100 and 5000, more preferably between 100 and 2000, and most preferably between 150 and 1000. Those skilled in the art can understand that polyethylene glycol is synonymous with polyethylene oxide or polyoxyethylene, and they have different names only because of different preparation methods, naming systems, or molecular weights. They can be used interchangeably without limiting the substantive scope of this case. Exemplary structural formula may be formula 3

EXAMPLE 1

Synthesis Method of Sulfonated Chitosan

In the sulfonation step, 40 ml of concentrated sulfuric acid was poured into a 500 ml round-bottom flask in a 4° C. ice bath to avoid rapid temperature rise causing violent reactions. After stirring for a while, dropwisely adding the corresponding equivalent of chlorosulfonic acid (the equivalent ratio of chlorosulfonic acid to chitosan is 5:1) into the round bottom flask, and removing the ice bath until the end of the exothermic reaction. Finally, 5 g chitosan with a weight average molecular weight of 350,000 (purchased from Sigma-Aldrich, with a degree of deacetylation of about 80%) was added to the round bottom flask and stirred for 1 hour to carry out the sulfonation reaction.

In the purification step, ether was used as the non-solvent to precipitate out the product. The above mentioned reaction mixture in the round bottom flask was poured into a beaker with 300 ml ether in an ice bath to allow the product to precipitate. The precipitate was collected by filteration with filter paper to obtain the product. The product was then dissolved in water and collected in a 1000 ml beaker.

In the lithium-ion exchange step, 1M lithium hydroxide solution was used to neutralize the above-mentioned aqueous solution of product that exhibits strong acidity until the pH value approaches 7. At the same time, lithium ions were allocated on the sulfonate group of the chitosan by the neutralization reaction. After completing the neutralization reaction, the aqueous solution was concentrated by rotary evaporating to about 100 ml, and the residual solution was subjected to dialysis against deionized water for three days so that small molecules could be dissolved in the deionized water to remove possible salts and impurities to obtain purified sulfonated chitosan (SCS).

In the freeze-drying step, the SCS aqueous solution was poured into a 250 ml round bottom flask, and was froze on the wall of the flask by liquid nitrogen. A vacuum system was connected to lower the pressure and the solvent was directly sublimated into gas. The water in the SCS aqueous solution was completely removed after applying vacuum for 6 hours at room temperature to obtain SCS flakes, which were then grounded into powders for collection.

Nuclear magnetic resonance spectroscopy (NMR) can be used to detect whether sulfonation is successful and whether the solvent is completely removed. Elemental analysis method (instrument: German elementar Vario EL cube) was used to determine the degree of sulfonation, sulfonated molar percentage=(14×sulfur weight percentage)/(32×nitrogen weight percentage). For example, the degree of sulfonation is 150%-200%. The structural formula of sulfonated chitosan with lithium sulfonate group is as follows:

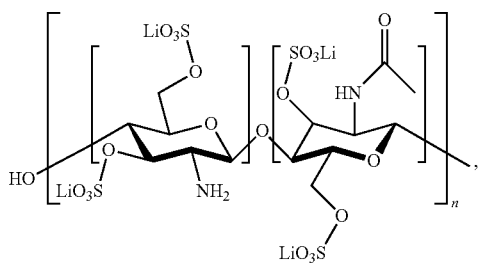

the lithium sulfonate group is grafted on O instead of N to facilitate the subsequent cross-linking of epoxy polyethylene glycol.

EXAMPLE 2

Synthesis Method of Epoxy Polyethylene Oxide

In the process of functionalization of two terminals of the polyethylene glycol, 10 grams of polyethylene glycol (PEO, MW=400, purchased from Alfa Aesar) (equivalent of 1) was put into a 500 ml three-neck bottle, and which was subjected to vacuum drying for 24 hours, then 150 ml anhydrous tetrahydrofuran (THF) was added under nitrogen atmosphere. After that, the three-neck bottle was placed in a hot water bath at 40° C. to allow PEO completely dissolve in THF and cooled to room temperature. 2.2 equivalents of sodium hydride (NaH) was added to the three-neck bottle to react for 6 hours with continuous flow of nitrogen to remove the hydrogen generated during the reaction. Afterwards, 10 equivalents of epichlorohydrin was injected into the three-necked flask using a syringe and reacted for 20 hours. The reaction scheme is as follows:

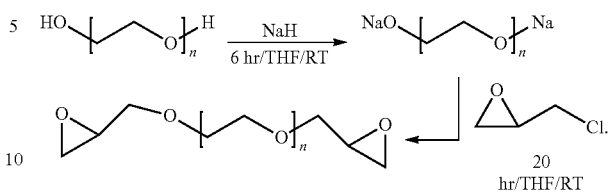

In the purification step, the sodium chloride salt and excessive sodium hydride generated in the reaction are filtered out to render the solution appeared in transparent orange. The THF was subsequently removed through rotary evaporation. Afterwards, the three-necked flask was placed in a 45° C. water and connected to the vacuum system to stand still for 6 hours to remove epichlorohydrin and the residual THF. Finally, the synthesized epoxy polyethylene oxide (ePEO) is stored in the refrigerator. Nuclear magnetic resonance spectroscopy can be used to detect whether there are epoxide groups and whether the solvent is completely removed.

EXAMPLE 3

Production Method of Electrode Material

Si feed particles (PyroPowders GmbH, Germany) with a metallurgical purity of >98% and an average particle size of 17.1 μm were ground into Si nanoparticles having an average size of 118 nm in ethanol. Suspension having 10 wt. % Si nanoparticle, 0.2 wt. % ethyl cellulose and 0.2 wt. % carbon black in ethanol was sprayed onto graphite particles to form a coating in a MiniGlatt (Glatt GmbH, Germany) fluidized bed granulator. The composite particles were than mixed with pitch particles (China steel, Taiwan) with a weight ratio of composite: pitch=90:10 in a rotating plastic cylinder at 900 rpm for 50 minutes. Then, they were placed in a tubular furnace and thermally decomposed at 1000° C. under 3% $H_2$ in $N_2$ for 3 hours so as to obtain the silicon-carbon active particles (Si@G).

The above silicon-carbon active particles were used as the electrode material (anode electrode) active particles. A simple preparation method is used to coat the outer layer of the silicon-carbon active particles with an elastic layer which may be the sulfonated chitosan with 200% sulfonation degree in Example 1 cross-linked with the epoxy polyethylene glycol in Example 2.

The silicon-carbon active particles were homogeneously dispersed in 20 ml of alkaline solution in a round bottom flask placed in an oil pot and preheated to 80° C. The pH value was about 7-11, preferably 7-9, for example 7, 8 or 9. Firstly, the SCS and the ePEO were dissolved in 3 ml of alkaline solution separately and shook for 20 minutes with an ultrasonic machine. After they were completely dissolved, the mixed solution of SCS and ePEO was dropped into the above-mentioned round bottom flask. After stirring for 4 hours, the flask was placed in a vacuum oven at 80° C. for evaporating the remaining solvent and dried for 12 hours for curing and cross-linking to obtain the silicon-carbon active particles coated with the sulfonated chitosan cross-linked epoxy polyethylene glycol (Si@G-XPEO-SCS), the particle powder was collected and washed with 20 ml methanol and 5 ml deionized water, and dried in a vacuum oven at 80° C. for 12 hours, which was the electrode material of the embodiment. The network structure of the cross-linked XPEO-SCS can be represented by the following structural formula 4. PEO is cross-linked on N:

Formula 4:

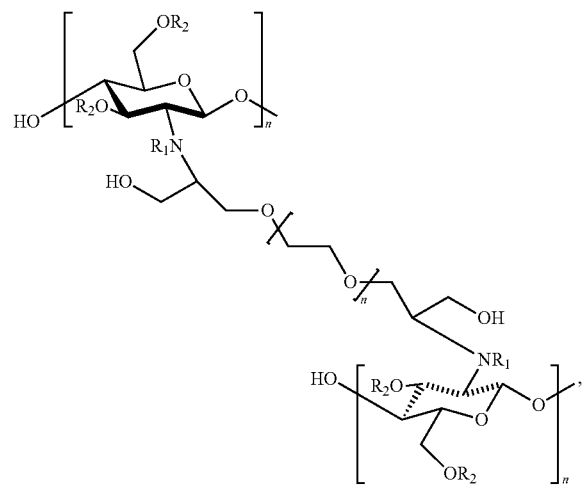

$R_1$ is —H, —COCH$_3$ or —C$_3$H$_6$SO$_3$H, $R_2$ is —SO$_3$H, —SO$_3$Na, —SO$_3$Li or H.

In order to understand the properties of the elastic layer thoroughly, a solvent casting method and a substrate of Teflon paper were used to form a film. First, chitosan (CS) solution or SCS and the crosslinking agent were mixed and filled in the mode for film formation for about 72 hours in an oven at 60° C., the crosslinking agent was glutaraldehyde (GA) or the epoxy polyethylene glycol of the example 2. When the film was dried, it was cured with a relatively high temperature. After that, the formed film was subjected to Dynamic Mechanical Analysis (DMA) and Thermogravimetric analysis (TGA). There were five groups for comparison, as shown in Table 1. The chitosan with a sulfonation degree of 100 mole % is sulfonated with 1, 3-propane sultone. The chitosan with a sulfonation degree of 200 mole % is sulfonated with chlorosulfonic acid.

TABLE 1

| No. | Group | CS or SCS (mg) | Crosslinker (mg) | Film thickness (μm) |
|---|---|---|---|---|
| 1 | CS | 100 | x | 38 |
| 2 | XGA-SCS1 | 100 (DS 100 mole %) | 10 | 20 |
| 3 | XPEO-SCS1 | 100 (DS 200 mole %) | 30 | 300 |
| 4 | XPEO-SCS2 | 100 (DS 200 mole %) | 60 | 250 |
| 5 | XPEO-SCS3 | 100 (DS 200 mole %) | 100 | 288.7 |

The above samples were cut to a rectangular size of 10 mm*5 mm and then clamped on both sides using a TA instrument (SDT-Q800) to observe the relationship between the stress and the strain of the samples by increasing the applied stress by 0.1 Newton per minute until 18 Newton was reached. As shown in FIG. 1A and Table 2, it is well demonstrated that the film properties of the samples with two different crosslinking agents (GA or PEO (PEO is an abbreviation of ePEO in the examples of the present invention)) are significantly different. The film formed by adding GA as a crosslinking agent was very fragile and had no ductility, so that it was broken while stretching. With regard to the films formed by adding PEO as a crosslinking agent, it was found that XPEO-SCS1 was relatively easily broken due to less PEO, but XPEO-SCS1 was still better than the film formed by adding GA as a crosslinking agent. In XPEO-SCS2, more PEO was added, so that more PEO was grafted on the SCS backbone to increase the elongation. In XPEO-SCS3, much more PEO was added. More PEO was grafted on the main chain of the SCS, thereby providing higher degree of cross-linking and increasing the elongation rate so as to greatly improve the toughness and tensibility of the film. Therefore, the cross-linked elastic network structure of XPEO-SCS3 may become an excellent elastic layer for coating the anode active material, which can simultaneously restrict the volume expansion of the anode active material, and can also have sufficient toughness to relieve stress.

TABLE 2

| No. | Group | Young's modulus (Mpa) | Elongation (%) | Tensile Strength (MPa) |
|---|---|---|---|---|
| 1 | CS | 872.7 | 2.19 | 19 |
| 2 | XGA-SCS1 | 1022.7 | 2.35 | 24 |
| 3 | XPEO-SCS1 | 20.4 | 9.7 | 1 |
| 4 | XPEO-SCS2 | 3.5 | 40 | 1.1 |
| 5 | XPEO-SCS3 | 137.7 | 52 | 8.2 |

Figure 1B:
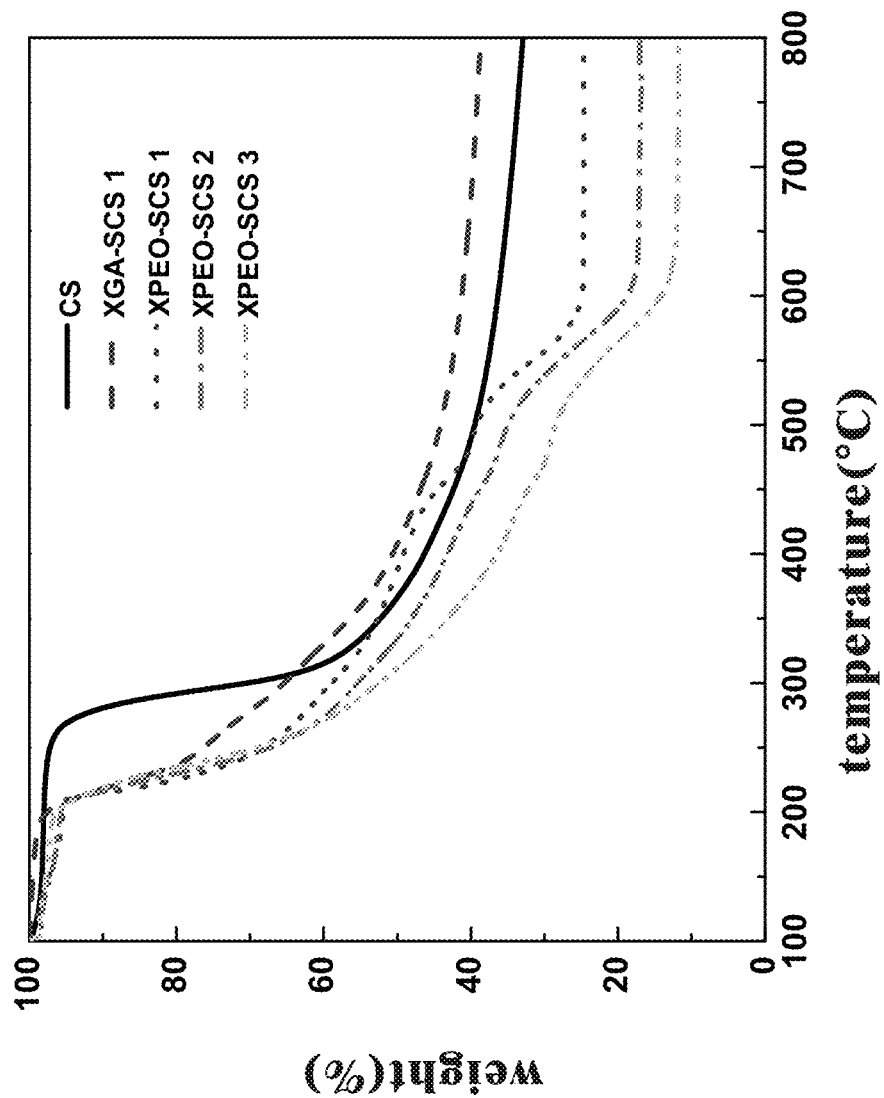
FIG. 1B shows the results of thermogravimetric analysis of each material in Table 1.

Thermogravimetric analysis measures the weight change of a sample in a nitrogen atmosphere at different temperatures by a TA instrument (Model: SDT-Q600), from 100° C. to 800° C. with an increment of 10° C. per minute, to investigate the physical properties or chemical properties of each group of substances. As shown in FIG. 1B and Table 3, there were two degradation temperatures in the groups of XPEO-SCS1, XPEO-SCS2 and XPEO-SCS3, one was the degradation temperature related to the sulfonic acid group (about 205° C.), and the other was the degradation temperature related to the epoxide group of ePEO (about 440° C.). Since these degradation temperatures exceeds the charging/discharging operating temperature of the batteries, there is no need to worry about any degradation during the charging/discharging process, and the films using the crosslinking agents of GA or PEO present significantly different properties.

TABLE 3

| No. | Group | $T_{d1}$(° C.) (related to the sulfonic acid group) | $T_{d2}$(° C.) (related to the SCS backbone or the epoxide group) |
|---|---|---|---|
| 1 | Chitosan (CS) | none | 257.5 |
| 2 | XGA-SCS1 | 211.6 | 262.1 |
| 3 | XPEO-SCS1 | 209.5 | 441.2 |
| 4 | XPEO-SCS2 | 208.5 | 443.9 |
| 5 | XPEO-SCS3 | 205.6 | 444.8 |

Figure 2A:
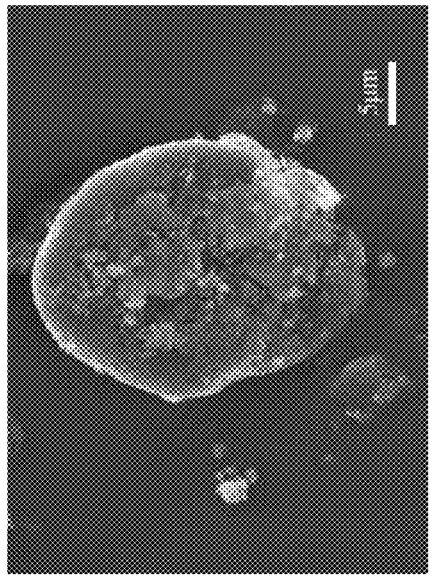
FIGS. 2A to 2D respectively show the scanning electron microscope (SEM) images of the original silicon-carbon active particles Si@G, the electrode material Si@G-XPEO-SCS1, the electrode material Si@G-XPEO-SCS2, and the electrode material Si@G-XPEO-SCS3 according to the embodiments of the present invention.
Figure 2B:
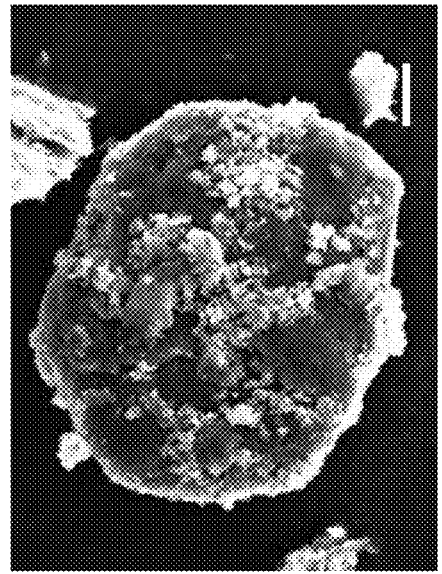
Figure 2C:
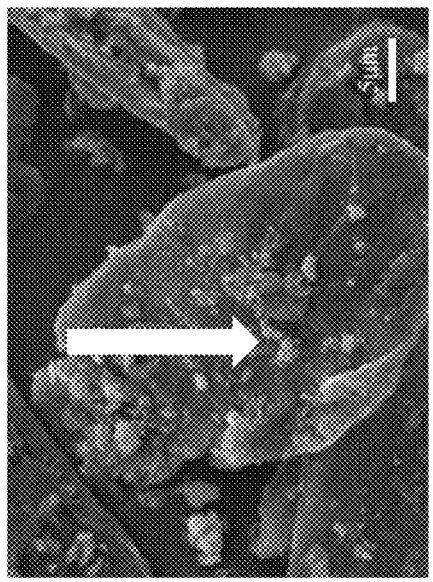
Figure 2D:
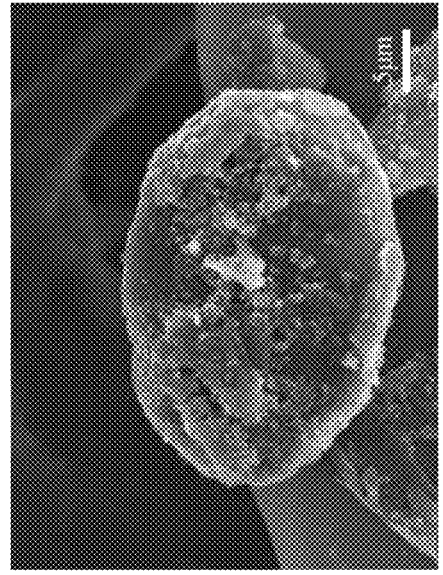

As shown in FIGS. 2A to FIG. 2D, in order to understand the surface morphology of electrode materials coated with different formulations, the electrode materials Si@G-XPEO-SCS1, Si@G-XPEO-SCS2, and Si@G-XPEO-SCS3 were prepared with the following proportion in Table 4 and compared with the original silicon-carbon active particles (Si@G). A scanning electron microscope (Model: JEOL JSM6510, operating voltage: 15 kV) was used to observe the surface morphology. The bulk material in FIG. 2A was graphite, and the off white particles pointed to by the white arrow were silicon particles. FIGS. 2B to 2D showed that the silicon-carbon active particles coated with elastic layers of different formulations looked similar to the original silicon-carbon active particles, demonstrating that the alkaline solution during the coating process did not etch the surface of the silicon-carbon active particles. There was no accumulation of residual salt, and the elastic layer looked uniform, thin and transparent.

TABLE 4

| Weight ratio (300 mg Si@G) | Si@G | scs | PEG | Sulfonation (mole) % |
|---|---|---|---|---|
| Si@G-XPEO-SCS1 | 100 | 3 | 0.9 | 200% |
| Si@G-XPEO-SCS2 | 100 | 3 | 1.8 | 200% |
| Si@G-XPEO-SCS3 | 100 | 3 | 3 | 200% |

The electrode materials of the embodiments of the present invention were analyzed with the Time-of-Flight Secondary Ion Mass Spectrometer (TOF-SIMS) (Brand and Model: Germany ION-TOF, TOF-SIMS V) and compared with the electrode material using GA as the crosslinking agent. Table 5 showed each group for comparison. The surface of each sample in Table 5 was bombarded with a primary ion beam ($Bi^{1+}$) with an acceleration voltage of 30 keV. The current was 1 pA, the pressure was $1\times10^{-8}\sim7\times10^{-8}$ millitorr, and the mass resolution range (m/$\Delta$m) was 3000 to 6000. The data was collected in negative-ion mode and the calculated results are shown in Table 5.

TABLE 5

| Weight ratio (300 mg Si@G) | Si@G-XGA-SCS3-1 | Si@G-XPEO-SCS1 | Si@G-XPEO-SCS3 |
|---|---|---|---|
| Si@G | 100 | 100 | 100 |
| SCS | 3 | 3 | 3 |
| GA or PEO | 1.2 | 0.9 | 3 |
| sulfonation (mole) % | 200% | 200% | 200% |
| I at m/z 261 ± 0.5 | 50 | 383 | 693 |
| I at m/z 155 ± 0.5 | 2245 | 2181 | 2088 |
| I at m/z 80 ± 0.5 | 24621 | 6426 | 8288 |
| I at m/z 32 ± 0.5 | 5120 | 4203 | 4261 |
| I at m/z 14 ± 0.5 | 29754 | 34627 | 29930 |
| (I at m/z 261 ± 0.5 divided by I at m/z 32 ± 0.5) × 100% | 0.98% | 9.11% | 16.26% |
| (I at m/z 261 ± 0.5 divided by I at m/z 14 ± 0.5) × 100% | 0.17% | 1.1% | 2.31% |
| (I at m/z 261 ± 0.5 divided by I at m/z 80 ± 0.5) × 100% | 0.2% | 5.96% | 8.36% |

Figure 3A:
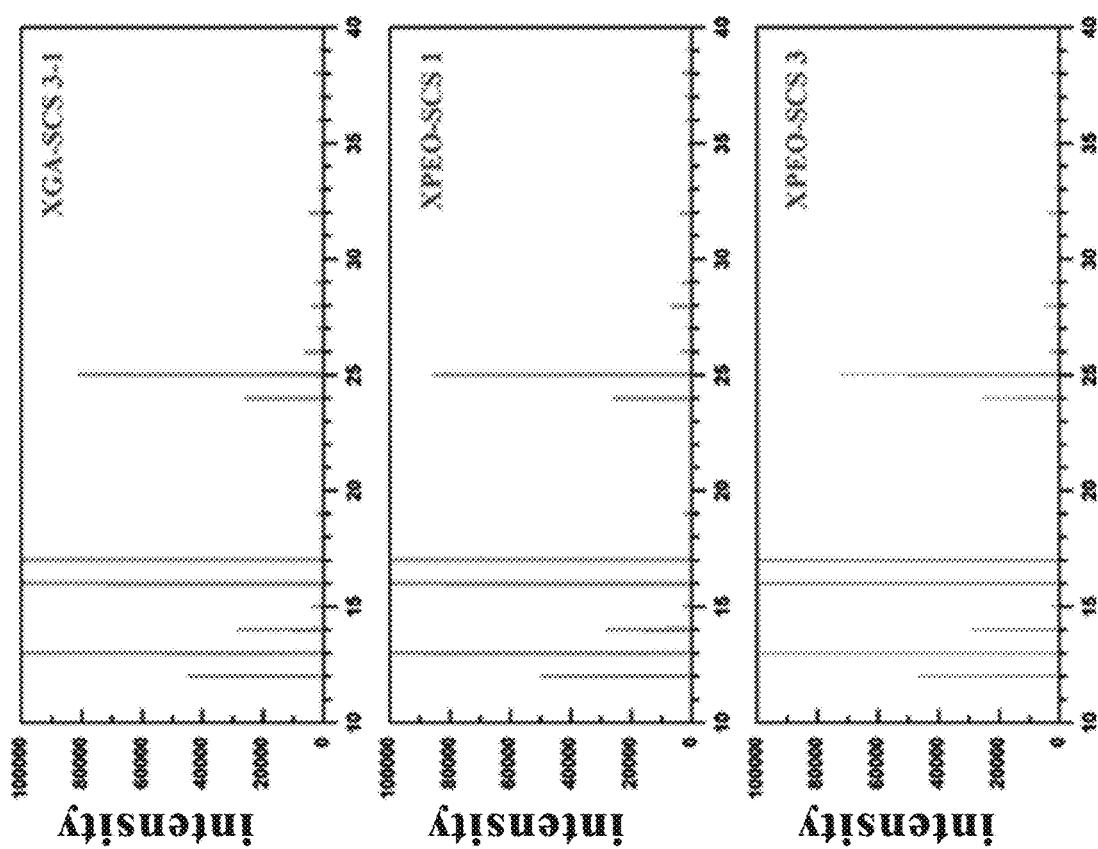
FIG. 3A sequentially from top to bottom shows partial mass spectrograms of the TOF-SIMS analysis results of the electrode material Si@G-XGA-SCS3-1, the electrode material Si@G-XPEO-SCS1, and the electrode material Si@G-XPEO-SCS3, which demonstrates the intensity of the characteristic peaks at the mass-to-charge ratio (m/z) between 10 and 40.
Figure 3B:
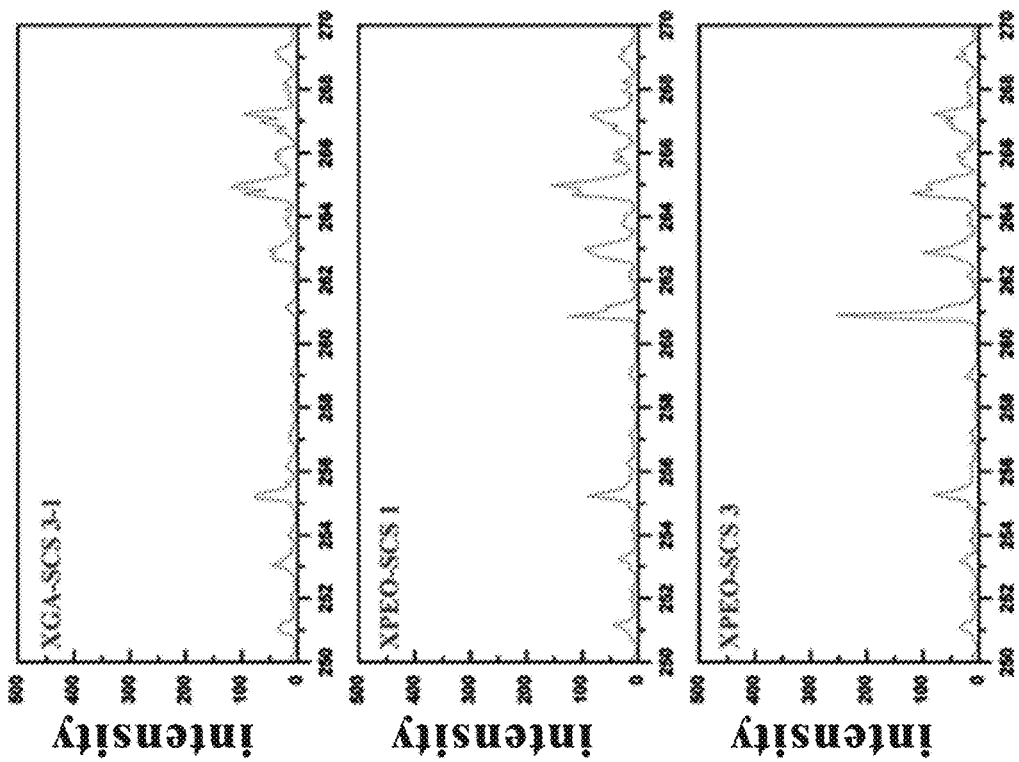
FIG. 3B sequentially from top to bottom shows partial mass spectrograms of the TOF-SIMS analysis results of the electrode material Si@G-XGA-SCS3-1, the electrode material Si@G-XPEO-SCS1, and the electrode material Si@G-XPEO-SCS3, which demonstrates the intensity of the characteristic peaks at the mass-to-charge ratio between 250 and 270.

FIG. 3A, FIG. 3B and Table 5 reveal the relative intensities of several important characteristic peaks. The anion with a charge-to-mass ratio of 261±0.5 relating to the $C_{12}H_{23}O_5N$ group demonstrates a characteristic peak with total intensity of $3\times10^2$ or above, which is the crosslinking agent segment of PEO. There is a significantly higher total intensity in the electrode materials Si@G-XPEO-SCS1 and Si@G-XPEO-SCS2 using PEO as the crosslinking agent at m/z 261±0.5 compared to the electrode material Si@G-XGA-SCS3-1 using GA as the crosslinking agent. The anion with a charge-to-mass ratio of 32±0.5 relating to the sulfur element of sulfonic acid group demonstrates a characteristic peak with total intensity of $4\times10^3$ or above. The anion with a charge-to-mass ratio of 14±0.5 relating to the nitrogen demonstrates a characteristic peak with total intensity of $2\times10^4$ or above. The anion with a charge-to-mass ratio of 155±0.5 relating to the carbohydrate ring structure demonstrates a characteristic peak with total intensity of $2\times10^3$ or above. The anion with a charge-to-mass ratio of 80±0.5 relating to $SO_3$ demonstrates a characteristic peak with total intensity of $6\times10^3$ or above.

The above result proves that the electrode materials of the embodiment of the present invention using ePEO as the crosslinking agent provide the $C_{12}H_{23}O_5N$ segments and exhibit the advantage of improving the lithium ion transfer between different segments, which demonstrates the ePEO differs considerably from the crosslinking agent GA in properties and functions. The crosslinking segments of the embodiment of the present invention can be differentiated by dividing the total intensity value (counts) of the characteristic peak (charge-to-mass ratio 261±0.5) that has a great correlation with the crosslinking agent PEO by the total intensity value (counts) of the reference characteristic peak (for example, the charge-to-mass ratio 14±0.5 or 32±0.5). For example, the ratio of the total intensity of the characteristic peaks at mass-to-charge ratio (m/z) 261±0.5 to the total intensity of the characteristic peaks at mass-to-charge ratio (m/z) 32±0.5 is greater than 2%, more preferably greater than 5%, most preferably greater than 10%. Or the ratio of the total intensity of the characteristic peaks at mass-to-charge ratio (m/z) 261±0.5 to the total intensity of the characteristic peaks at mass-to-charge ratio (m/z) 14±0.5 is greater than 0.5%, more preferably greater than 1%, most preferably greater than 2%. Or the ratio of the total intensity of the characteristic peaks at mass-to-charge ratio (m/z) 261±0.5 to the total intensity of the characteristic peaks at mass-to-charge ratio (m/z) 80±0.5 is no less than 0.2%.

EXAMPLE 4

Production of the Anode Electrode and Its Properties

In the experiment of graphite system, the formulation proportion in Table 4 and the production method of electrode material in Example 3 were used. The anode electrode was manufactured using natural graphite (NG) (specific capacity 372 mA-hour/g) instead of Si@G as the anode active material to test the coating stability on the active material. In the experiment of silicon carbon system, silicon graphite composite (Si@G) (specific capacity 800 mA-hour/g) was used as the active material of anode electrode. In these two systems, the conductive additives were carbon black (Super P, a product of Taiwan Maxwave Co., Ltd.), and the binders were Alginic acid sodium salt (AG). The weight percentage of graphite: carbon black: AG was 93:3:4, and the weight percentage of silicon-graphite composite: carbon black: AG was 90:3:7.

All the above materials were stirred uniformly into a mixture and water was add as a solvent using the ratio of 40 microliters/mg to 50 microliters/mg related to the binder. Finally, a slurry composition is adjusted to certain viscosity. The slurry composition was coated onto a copper foil with a thickness of about 15 μm by using a heated flat coater (MSK-AFA-HC100) and an adjustable scraper (KTQ-80F), and the finished electrode sheet was dried in the vacuum oven at 80° C. for 12 hours to completely remove water and complete the epoxy-amine reaction of the PEO crosslinker system. The finished electrode sheet was rolled to 70% to 80% of its original thickness, which is about 50 microns, in order to increase the density of the electrode and obtain appropriate porosity. Finally, the electrode sheet was trimmed into discs with a diameter of 13 mm using a tablet press.

The above-mentioned disc electrode was assembled in the coin cell (CR2032) to test its electrochemical performance. The coil cell uses Celgard@1600 as polypropylene separator and lithium foil as the counter electrode, and was assembled in an argon-filled glove box. The electrolyte consisted of 1M lithium hexafluorophosphate ($LiPF_6$) in a mixture of ethylene carbonate (EC)/ethyl methyl carbonate (EMC) 1:2 (in vol. %) and 2% by volume of vinylene carbonate (VC) as an additive. In the experiment of the graphite system, an additional 40% by volume of Propylene Carbonate (PC) was used to test the coating stability on the active material. Similarly, in the Si@G system, an additional 10% by weight of fluoroethylene carbonate (FEC) is added, which is very helpful to the formation of a stable solid electrolyte interphase for the silicon anode.

Cell cycling charge/discharge test was conducted by Arbin BT-2043 battery tester. Before any cell test, such as long-term cycling tests or rate performance tests, all cells was subjected to three charge/discharge cycles at low rate to form a robust SEI to facilitate subsequent tests. The cutoff voltage ranges between 1 mV to 1.2 V (versus $Li/Li^+$). Test conditions: (i) discharge (lithiation) process with a constant current (CC mode) mode at a rate of 0.1 C to 1 mV and with constant voltage mode (CV mode) at 1 mV until limited current was reached (0.01 C), and (ii) charging (de-lithiation) process at constant-current (CC) mode at a rate of 0.1 C to the cutoff voltage 1.2V. In the long-term cycling test, the current was increased to 0.5 C according to the capacity of anode during the formation cycles. For rate capability test, charging current was variable, however, the discharging current was fixed at a rate of 0.1 C. All batteries were operated at room temperature.

Experiment 1: Testing the Protection Capability and Coating Effect of the Elastic Layer The elastic layer of the electrode materials in the Example 3 of the present invention has a good surface morphology in SEM, but it is unknown how it affects the battery performance. In order to figure it out, the electrode of the aforementioned graphite system was used and suitable for checking if the elastic layer provided a stable coating to form a good protection. The use of the electrolyte containing PC in the graphite system will cause the phenomenon of solvent co-intercalation because graphite has a layer structure. The unstable solid electrolyte interphase (SEI) causes the electrode to peel off, and leads to a large irreversible capacity.

Figure 4A:
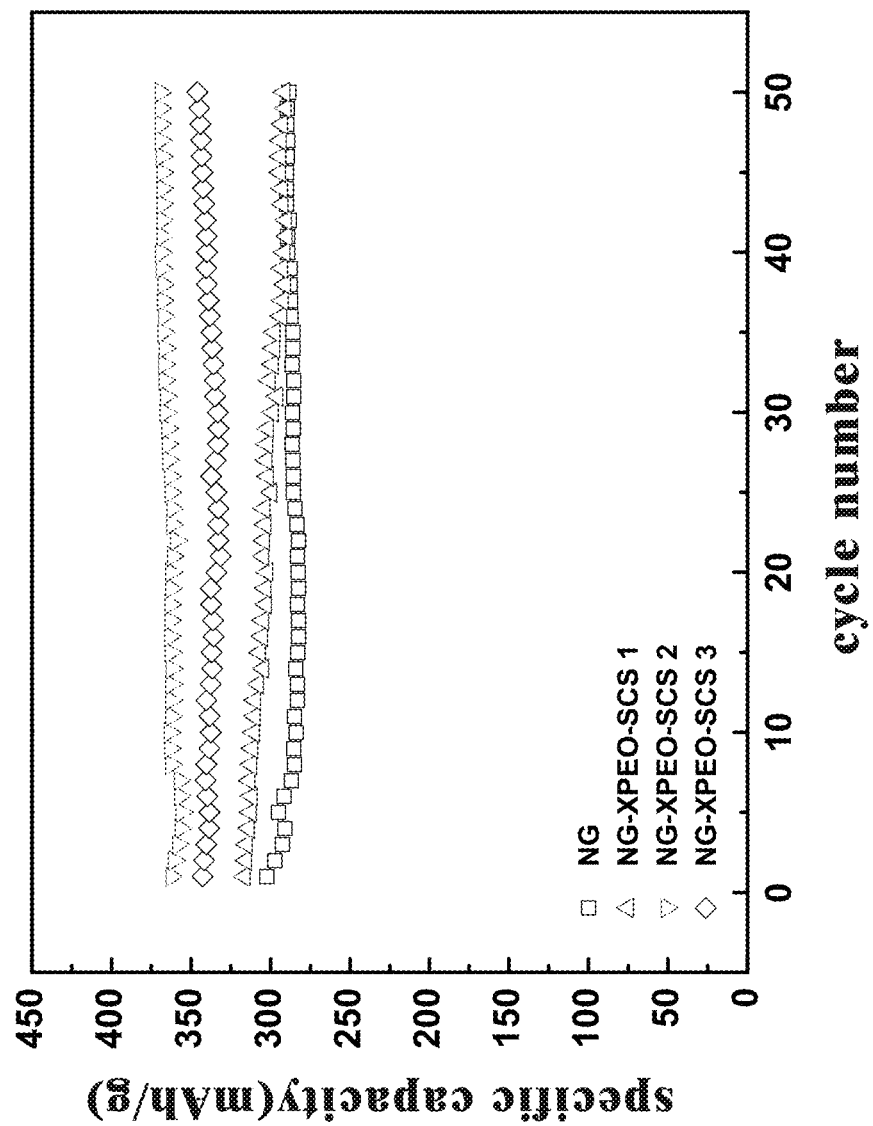
FIG. 4A is a schematic diagram showing the relationship between specific capacity and cycle number of batteries made from the electrode material NG, the electrode material NG-XPEO-SCS1, the electrode material NG-XPEO-SCS2, or the electrode material NG-XPEO-SCS3.
Figure 4B:
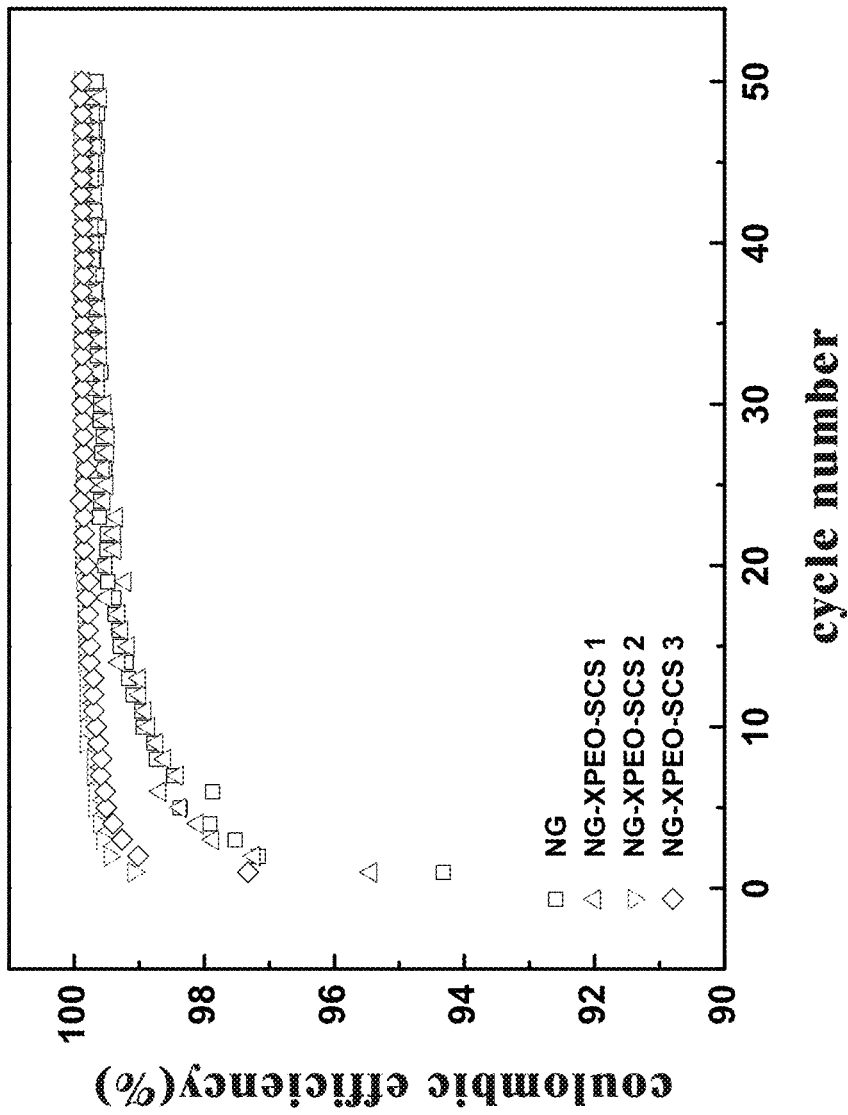
FIG. 4B is a schematic diagram showing the relationship between Coulombic efficiency and cycle number corresponding to the groups in FIG. 4A.

FIG. 4A shows that the battery without any elastic layer protection has the worst specific capacity, while the battery protected by the elastic layer in Example 3 has a higher specific capacity, wherein the specific capacity refers to the amount of power provided by the battery in a certain discharge condition. FIG. 4B shows that the Coulombic efficiency of the battery without any elastic layer protection is poor at the beginning of the cycle, while the battery protected by the XPEO-SCS1 elastic layer may not form sufficient protection due to the poor degree of crosslinking. Other groups have increased Coulomb efficiency at the beginning of the battery cycle due to stable coating, wherein the Coulomb efficiency is the ratio of the charge capacity to the discharge capacity in the same cycle. From this experiment, it can be understood that the elastic layer of the electrode material in Example 3 of the present invention may be stably coated when having a high degree of cross-linking, and the specific capacitance and Coulomb efficiency can be greatly improved.

Experiment 2: Long-Term Cycling Test of the Battery Made from the Electrode Material in the Example 3

Figure 5A:
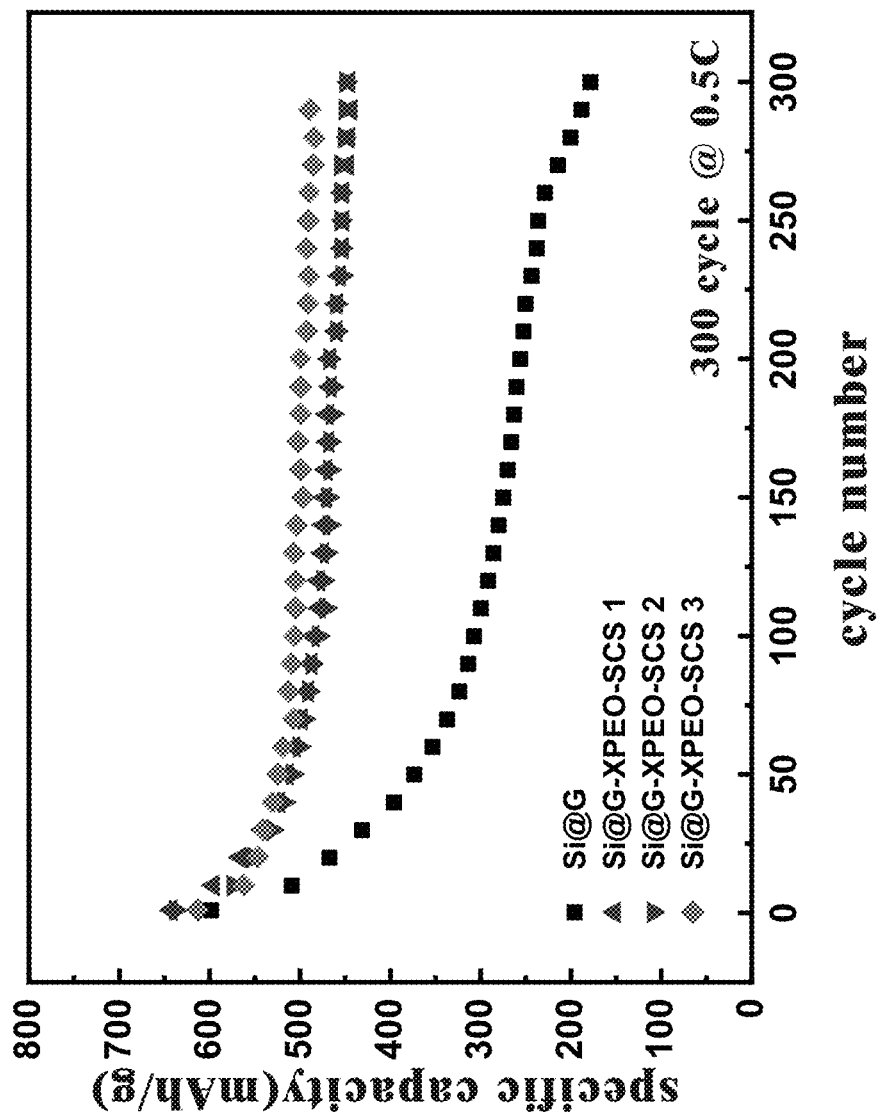
FIG. 5A is a schematic diagram showing the relationship between specific capacity and cycle number of batteries made from the electrode material Si@G, the electrode material Si@G-XPEO-SCS1, the electrode material Si@G-XPEO-SCS2, or the electrode material Si@G-XPEO-SCS3.
Figure 5B:
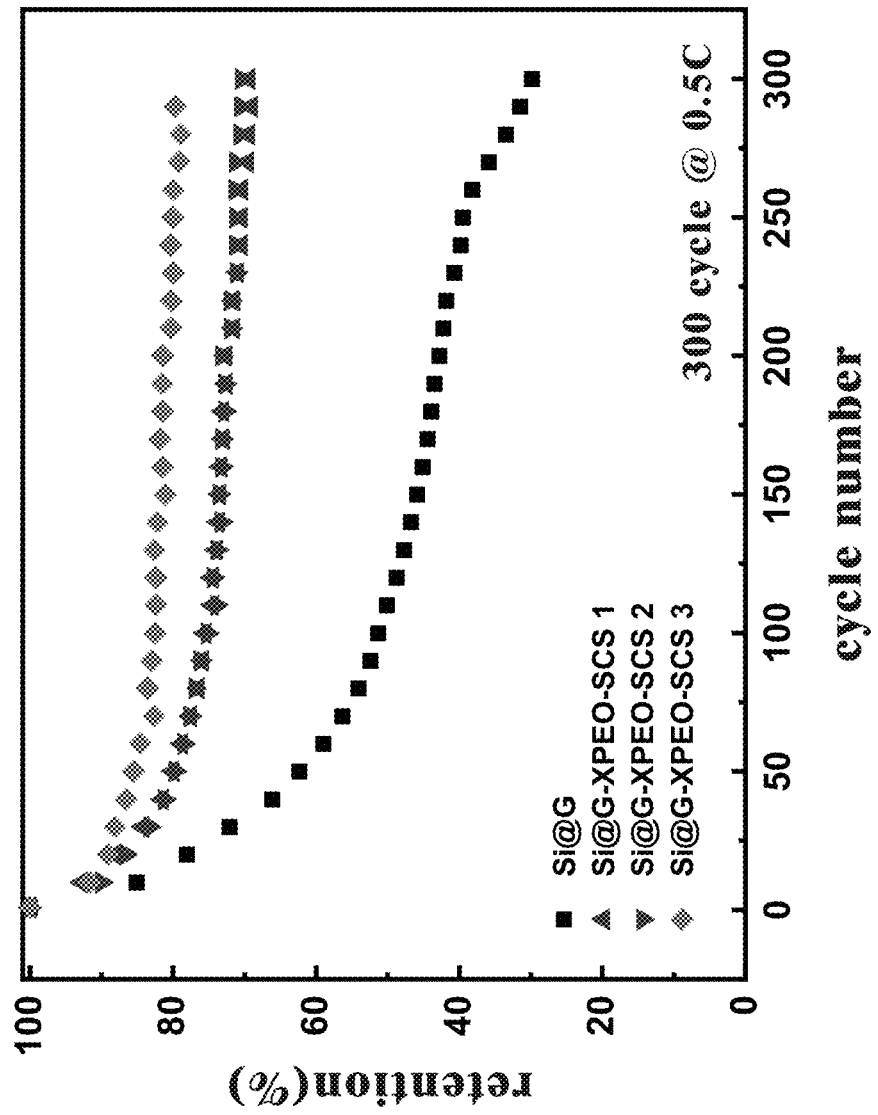
FIG. 5B is a schematic diagram showing the relationship between retention and cycle number corresponding to the groups in FIG. 5A.
Figure 5C:
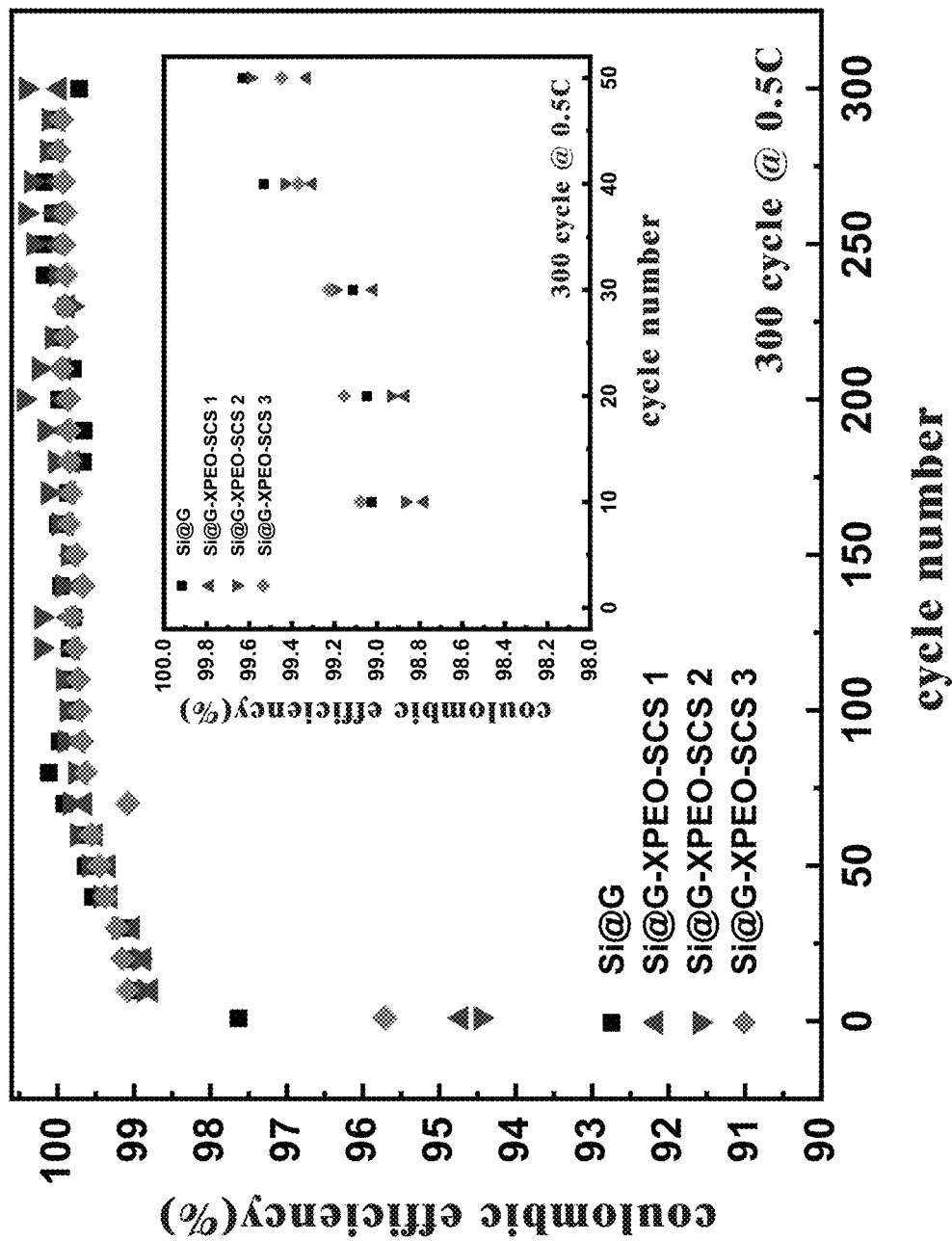
FIG. 5C is a schematic diagram showing the relationship between Coulombic efficiency and cycle number corresponding to the groups in FIG. 5A, and the small figure therein is an enlarged view of cycle number 1-50.
Figure 6A:
FIGS. 6A to 6D respectively show the SEM images of the electrode sheets made from the electrode material Si@G, the electrode material Si@G-XPEO-SCS1, the electrode material Si@G-XPEO-SCS2, or the electrode material Si@G-XPEO-SCS3 before battery cycling.
Figure 6B:
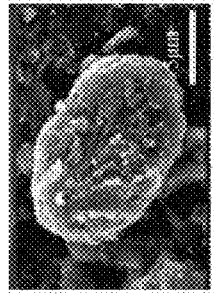
Figure 6C:
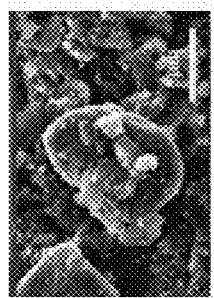
Figure 6D:
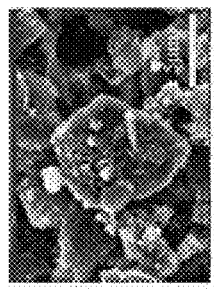
Figure 6E:
FIGS. 6E to 6H respectively show the SEM images of the electrode sheets made from the electrode material Si@G, the electrode material Si@G-XPEO-SCS1, the electrode material Si@G-XPEO-SCS2, or the electrode material Si@G-XPEO-SCS3 after battery cycling.
Figure 6F:
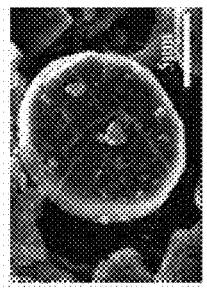
Figure 6G:
Figure 6H:
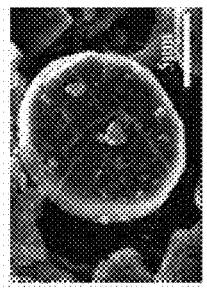

As shown in FIG. 5A, after confirming the coating effect of the elastic layer in the previous experiment, the performance of the battery made from electrode materials with different ratio of formulation in Table 4 was actually tested. We can observe that the battery protected by the XPEO-SCS elastic layer in Example 3 has a higher specific capacitance than the battery without the elastic layer, and the data shows that it can maintain long-term stability at a charge-discharge rate of 0.5 C at 300 cycles and the electric capacity can be maintained at 487 mAh/g. The capacity retention rate is defined as the specific capacity of the current cycle divided by the specific capacity of the first cycle and can be used to know the cycle life of the battery. As shown in FIG. 5B, from the standpoint of long-term stability, the retention rate of the battery made from the unprotected electrode material (Si@G group) has dropped to less than 30% in the first 50 cycles. The retention rate of the elastic layer protected groups can be as high as 80%. Even if the Si@G-XPEO-SCS1 group has a lower degree of cross-linking, it still has a retention rate of 70%. As shown in FIG. 5C, the battery protected by the elastic layer with a higher degree of cross-linking, especially the Si@G-XPEO-SCS3 group, has a more stable Coulombic efficiency than other groups, and the Coulombic efficiency has been pulled over 99% in the first few cycles until the 300 cycles are completed. These electrical properties conclude that a highly cross-linked elastic layer can effectively release the stress caused by volume expansion, which is more effective than a brittle and hard protective layer and can improve battery performance.

Experiment 3: Surface Morphology of the Electrode Materials in Example 3 Before/after Long-Term Cycling The batteries were dismantled after complete de-lithiation. Then, the electrode were rinsed with EC/EMC (volume ratio 1:2) electrolyte, dried, and subjected to SEM surface morphology analysis. FIGS. 6A-6D show the internal particle morphology of the electrode sheet before the battery cycling, and FIGS. 6E-6H show the internal particle morphology of the electrode sheet after 300 cycles at 0.5 C. Compared with the electrode sheet before cycling, the electrode sheet made from electrode material Si@G that is not protected by the elastic layer has obvious cracks after the battery cycling. The main reasons is that the formation of a thick solid electrolyte interphase layer and the serious expansion problem lead to the disintegration of silicon. However, the silicon particles protected by the XPEO-SCS elastic layer basically have a relatively flat surface. It can be seen that the elastic layer can effectively maintain the strength of the Si@G particles.

Table 6 is the volume expansion table before and after the battery cycling. We observed that the Si@G-XPEO-SCS3 group with the highest degree of cross-linking after 300 cycles exhibits relatively less variation compared with other groups. Therefore, we believe that the elastic covalent cross-linked polymer structure formed by the addition of PEO crosslinking agent has a certain degree of ability to slow down the occurrence of volume expansion and constrain the silicon particles from peeling off.

TABLE 6

| thickness (μm) | Si@G | Si@G-XPEO-SCS1 | Si@G-XPEO-SCS2 | Si@G-XPEO-SCS3 |
|---|---|---|---|---|
| Original | 35 | 27.5 | 28 | 38.4 |
| After cycling | 81.4 | 40.5 | 41.9 | 47.7 |
| Variation (%) | 132.5 | 47.2 | 49.6 | 24.2 |

Experiment 4: Rate Performance Test of the Battery Made from the Electrode Material of Example 3

Next, a charge/discharge rate performance test was performed. Before the test, all batteries were charged/discharged at 0.3 C for 50 cycles to achieve stable capacitance and Coulombic efficiency and then carried out the charge/discharge rate test. The setting conditions were slow insertion and quick extraction, that is, the de-lithiation is at different charge/discharge rates (C-rate), and the lithiation is at 0.1 C.

Figure 7A:
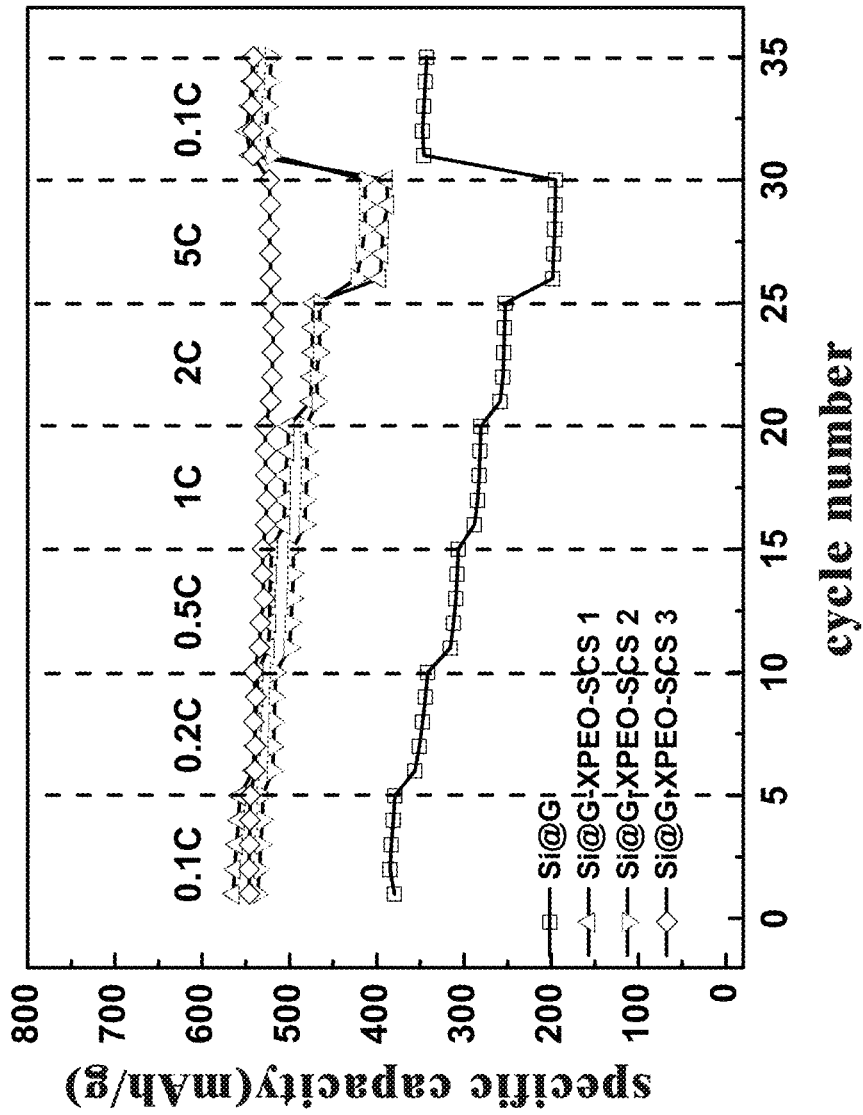
FIG. 7A is a schematic diagram showing the relationship between the specific capacity and the cycle number of batteries made from the electrode material Si@G, the electrode material Si@G-XPEO-SCS1, the electrode material Si@G-XPEO-SCS2 or the electrode material Si@G-XPEO-SCS3 at different charge/discharge current density.
Figure 7B:
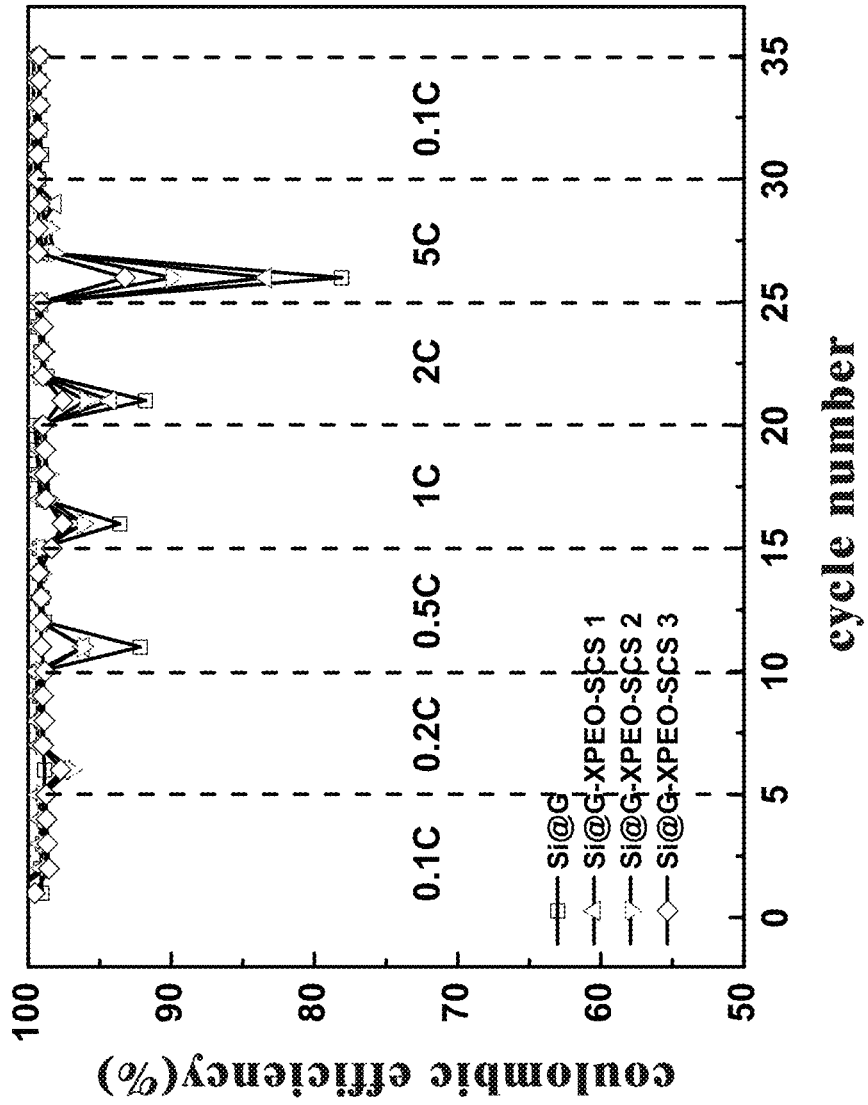
FIG. 7B is a schematic diagram showing the relationship between the Coulombic efficiency and the cycle number corresponding to the groups in FIG. 7A.
Figure 7C:
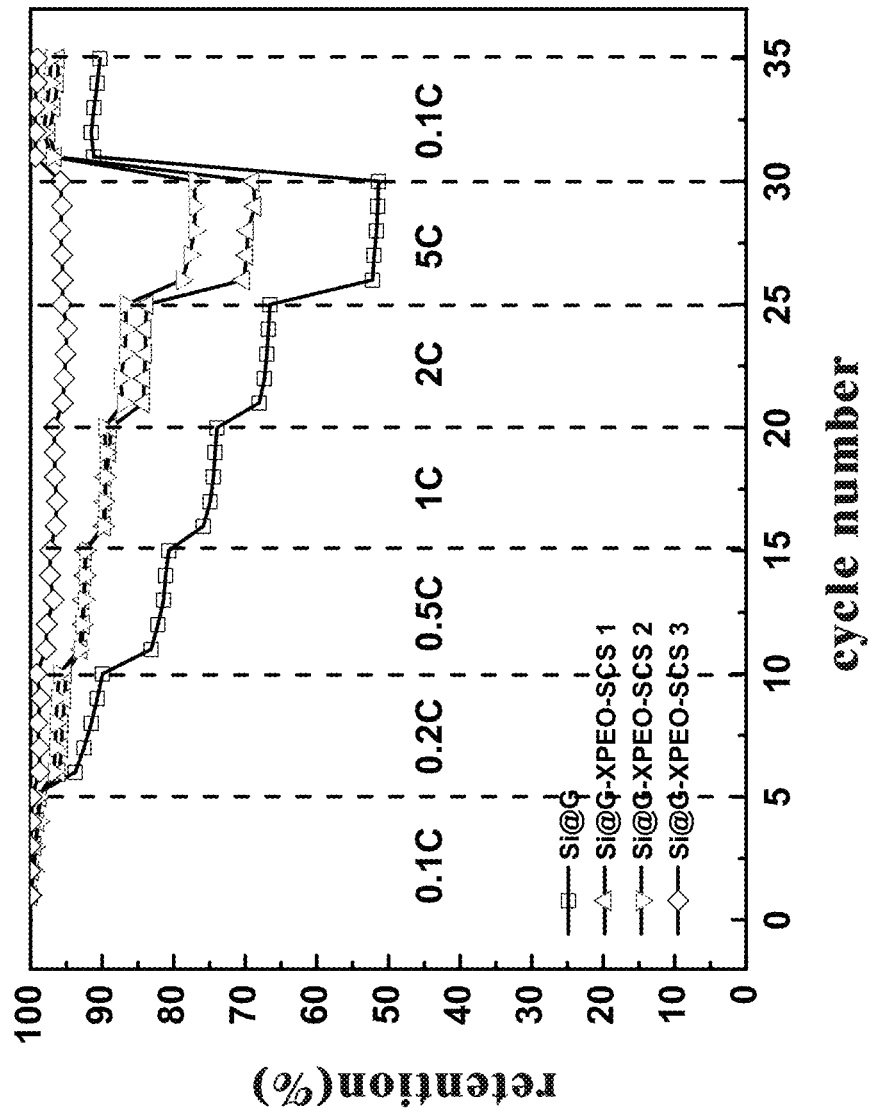
FIG. 7C is a schematic diagram showing the relationship between the retention and the cycle number corresponding to the groups in FIG. 7A.

As shown in FIG. 7A, it can be clearly observed that the Si@G-XPEO-SCS3 group maintains a stable specific capacitance at different charging rate and exceeds 500 mAh/g in every stage. However, the Si@G group without the protection of the elastic layer cannot even reach the specific capacitance of 400 mAh/g. FIG. 7B also demonstrates that the Coulombic efficiency in the Si@G-XPEO-SCS3 group is relatively stable. FIG. 7C demonstrates that the Si@G-XPEO-SCS3 group maintains a high retention rate of 95% regardless of 2C or 5C. The PEO segment could help lithium ions transfer between different segments of the structure, so that 521 mAh/g of specific capacitance can still be maintained at 5C.

These results show that there is such a significant improvement because the lithium sulfonate group serves as a lithium ion storage tank, and the elastic layer serves as a transmission channel for lithium ion transfer. At the same time, because of the presence of the PEO crosslinking agent, the PEO segment can also help lithium ion transfer in the case of amorphous, so that an elastic protective layer such as XPEO-SCS can withstand to be operated at high charge/discharge rates. PEO provides a range of flexibility and can maintain excellent electrochemical properties under 300 charge/discharge cycles.

Experiment 5: Comparison of Capacity Retention in Batteries Made from Electrode Material Using Different Crosslinking Agent In Table 1 of Example 3, two different crosslinking agents GA and PEO were used. After various tests, the protection effect of SCS with 200% sulfonation degree is the best in the GA crosslinking agent system. Therefore, the comparison of retention was performed between the best group using GA crosslinking agent and best group using PEO crosslinking agent, and the long-term cycling test and the charge/discharge rate performance test were also performed. Table 7 shows the composition details of each group.

TABLE 7

| Weight ratio (300 mg Si@G) | Si@G | SCS | GA or PEO | Sulfonation (mole) % |
|---|---|---|---|---|
| Si@G | 100 | X | X | X |
| Si@G-XGA-SCS3-1 | 100 | 3 | 1.2 | 200% |
| Si@G-XPEO-SCS3 | 100 | 3 | 3 | 200% |

Figure 8A:
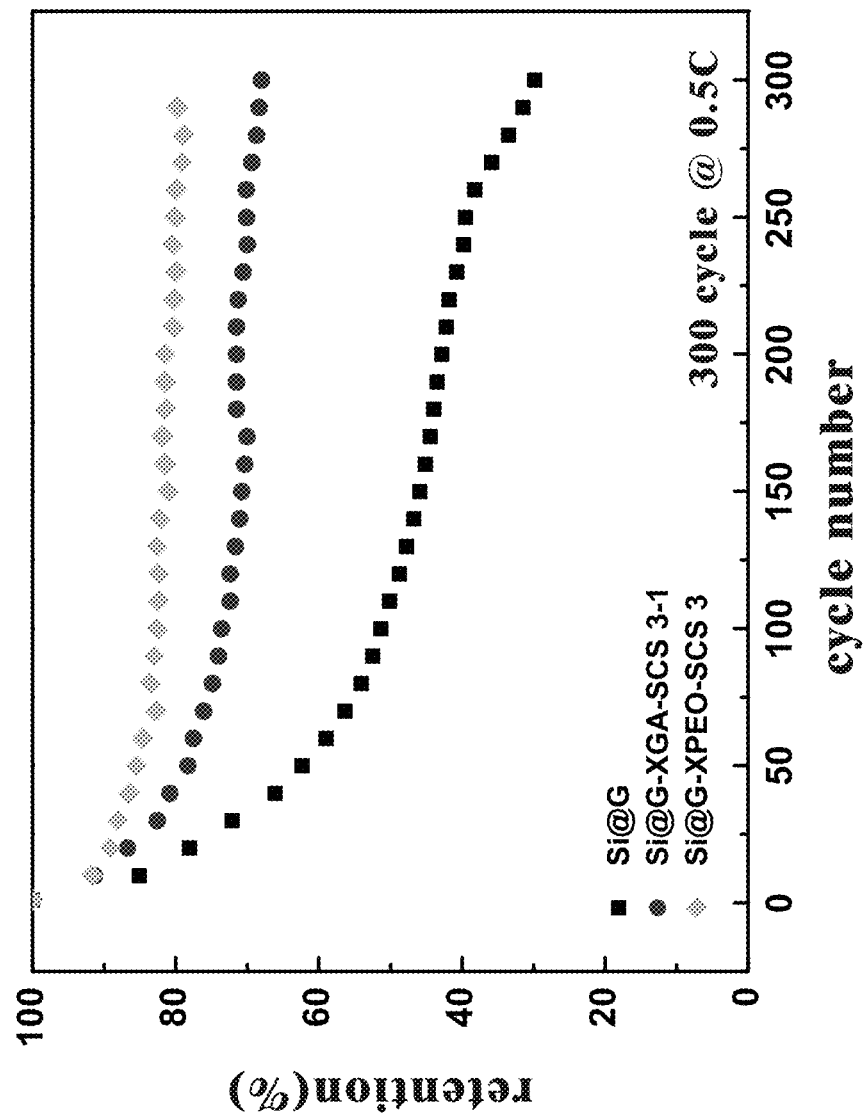
FIG. 8A is a schematic diagram showing the relationship between the retention and the cycle number of batteries made from the electrode material Si@G, the electrode material Si@G-XGA-SCS3-1, or the electrode material Si@G-XPEO-SCS3.

As shown in FIG. 8A, in the long-term cycling test, Si@G-XPEO-SCS3 effectively slows the decline of the electrode in the first 50 cycles and showed very good cycle stability. The Si@G-XGA-SCS3-1 group gradually stabilized until nearly 100 cycles. This mainly attributes to the variation of volume expansion. Because the electrolyte will be absorbed during the charging/discharging process, the XPEO-SCS protective layer has a flexible and tough range, which can accept a little volume expansion and accommodate more lithium ions. The electrode volume is expanded during the lithium insertion and the electrode is returned to almost similar appearance with the original electrode when lithium is removed, thereby slowing down the peeling of the silicon particles and generation of unstable SEI.

Figure 8B:
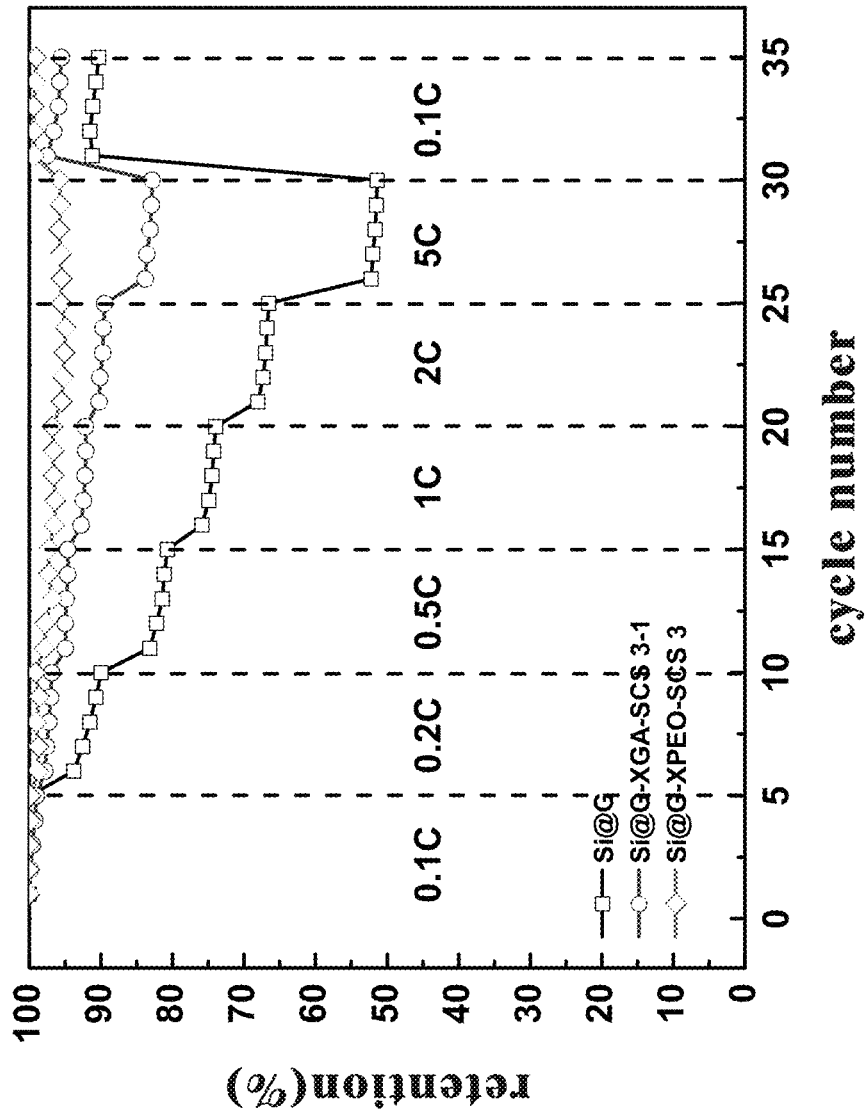
FIG. 8B is a schematic diagram showing the relationship between the retention and the cycle number on the charge-discharge performance test corresponding to the groups in FIG. 8A.

As shown in FIG. 8B, at different charging rates, the retention rate in Si@G-XPEO-SCS3 group can be as high as 95%. Even if SCS with 200% sulfonation is also used in Si@G-XGA-SCS3-1 group, but the performance in the high charge/discharge rate is not as good as the Si@G-XPEO-SCS3 group. It is obvious that the chain segment of the PEO crosslinker can help the lithium ions transfer between different structural intervals. However, with reference to the TOF-SIMS result in Example 3, there is indeed no higher characteristic peak at m/z 261±0.5 in the electrode material with GA as the crosslinking agent.

What is claimed is:

1. An electrode material comprising:
an electrode active material; and
an elastic layer coated on the surface of the electrode active material, wherein the elastic layer is a polymer of sulfonated chitosan cross-linked with epoxy polyethylene oxide, wherein the elastic layer comprises elements of carbon (C), hydrogen (H), oxygen (O), Nitrogen (N), and Sulfur(S), and the electrode material has the characteristic peaks at mass-to-charge ratio (m/z) 261±0.5, (m/z) 155±0.5, (m/z) 80±0.5, (m/z) 32±0.5, and (m/z) 14±0.5 using Time-of-Flight Secondary Ion Mass Spectrometer (TOF-SIMS) with the primary ion of $Bi^{1+}$.

2. The electrode material of claim 1, wherein the total intensity of the characteristic peaks at mass-to-charge ratio (m/z) 261±0.5 exceeds $3 \times 10^2$ in the analysis of the electrode material using TOF-SIMS with the primary ion of $Bi^{1+}$.

3. The electrode material of claim 1, wherein the total intensity of the characteristic peaks at mass-to-charge ratio (m/z) 32±0.5 exceeds $4 \times 10^3$ in the analysis of the electrode material using TOF-SIMS with the primary ion of $Bi^{1+}$.

4. The electrode material of claim 1, wherein the total intensity of the characteristic peaks at mass-to-charge ratio (m/z) 80±0.5 exceeds $6 \times 10^3$ in the analysis of the electrode material using TOF-SIMS with the primary ion of $Bi^{1+}$.

5. The electrode material of claim 1, wherein the total intensity of the characteristic peaks at mass-to-charge ratio (m/z) 14±0.5 exceeds $2 \times 10^4$ in the analysis of the electrode material using TOF-SIMS with the primary ion of $Bi^{1+}$.

6. The electrode material of claim 1, wherein the total intensity of the characteristic peaks at mass-to-charge ratio (m/z) 155±0.5 exceeds $2 \times 10^3$ in the analysis of the electrode material using TOF-SIMS with the primary ion of $Bi^{1+}$.

7. The electrode material of claim 1, wherein the ratio of the total intensity of the characteristic peaks at mass-to-charge ratio (m/z) 261±0.5 to the total intensity of the characteristic peaks at mass-to-charge ratio (m/z) 80±0.5 is not less than 0.2% in the analysis of the electrode material using TOF-SIMS with the primary ion of $Bi^{1+}$.

8. The electrode material of claim 1, wherein the ratio of the total intensity of the characteristic peaks at mass-tocharge ratio (m/z) 261±0.5 to the total intensity of the characteristic peaks at mass-to-charge ratio (m/z) 32±0.5 is greater than 2% in the analysis of the electrode material using TOF-SIMS with the primary ion of $Bi^{1+}$.

9. The electrode material of claim 1, wherein the ratio of the total intensity of the characteristic peaks at mass-to-charge ratio (m/z) 261±0.5 to the total intensity of the characteristic peaks at mass-to-charge ratio (m/z) 14±0.5 is greater than 0.5% in the analysis of the electrode material using TOF-SIMS with the primary ion of $Bi^{1+}$.

10. The electrode material of claim 1, wherein the weight ratio of the sulfonated chitosan to the epoxy polyethylene oxide is between 1:0.2 and 1:1.1.

11. The electrode material of claim 1, wherein the sulfonated chitosan is a sulfonated chitosan which is grafted to the lithium sulfonate groups.

12. The electrode material of claim 1, wherein the degree of sulfonation of the sulfonated chitosan is 150~200%.

13. The electrode material of claim 1, wherein the electrode active material is a graphite material, a silicon-carbon composite material, or a combination thereof.

14. A lithium-ion battery structure comprising: a separator, an electrolyte, and at least one electrode made from the electrode material of claim 1.

* * * * *